United States Patent
Campbell et al.

(10) Patent No.: US 9,114,890 B1
(45) Date of Patent: Aug. 25, 2015

(54) THRUSTER ORBIT CONTROL METHOD AND CONFIGURATION

(71) Applicant: Lockheed Martin Corporation, Bethesda, MD (US)

(72) Inventors: Brian D. Campbell, Newtown, PA (US); Neil E. Goodzeit, Princeton, NJ (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 14/642,562

(22) Filed: Mar. 9, 2015

Related U.S. Application Data

(62) Division of application No. 13/572,586, filed on Aug. 10, 2012.

(51) Int. Cl.
*B64G 1/24* (2006.01)
*B64G 1/26* (2006.01)

(52) U.S. Cl.
CPC *B64G 1/242* (2013.01); *B64G 1/26* (2013.01); *B64G 2001/245* (2013.01)

(58) Field of Classification Search
CPC .... B64G 1/10; B64G 1/242; B64G 2001/245; B64G 2001/247
See application file for complete search history.

(56) References Cited

U.S. PATENT DOCUMENTS

| | | |
|---|---|---|
| 5,020,746 A | 6/1991 | Anzel |
| 5,443,231 A | 8/1995 | Anzel |
| 5,813,633 A | 9/1998 | Anzel |
| 5,984,236 A | 11/1999 | Keitel et al. |
| 6,135,394 A | 10/2000 | Kamel et al. |
| 6,296,207 B1 * | 10/2001 | Tilley et al. ................ 244/169 |
| 6,435,457 B1 | 8/2002 | Anzel |

OTHER PUBLICATIONS

Ronald Corey, "Stationary Plasma Thruster Electric Propulsion for Large Communications Satellites," 28th AIAA International Communications Satellite Systems Conference, AIAA 2010-8688, Anaheim, CA, Aug. 2010.

* cited by examiner

*Primary Examiner* — Tien Dinh
*Assistant Examiner* — Richard R Green
(74) *Attorney, Agent, or Firm* — McDermott Will & Emery LLP

(57) ABSTRACT

Embodiments of the present invention provide an ion-thruster stationkeeping method and mounting configuration that reduces the propellant penalty when a single thruster fails, e.g., in the case where only three of a spacecraft's four ion thrusters are available. By improving firing efficiency for the single-thruster failure case, on-board propellant is reduced, thereby allowing increased payload mass. Also, the configuration supports both N/S and E/W stationkeeping using four ion thrusters (or three thrusters for the failure case) and therefore does not require a separate propulsion system or thrusters for E/W stationkeeping.

11 Claims, 8 Drawing Sheets

THRUSTER ORBIT CONTROL METHOD AND CONFIGURATION

CROSS-REFERENCE TO RELATED APPLICATIONS

This patent application is a divisional of U.S. patent application Ser. No. 13/572,586, filed Aug. 10, 2012, entitled "THRUSTER ORBIT CONTROL METHOD AND CONFIGURATION," which is hereby incorporated by reference in its entirety.

STATEMENT REGARDING FEDERALLY SPONSORED RESEARCH OR DEVELOPMENT

Not Applicable.

FIELD OF THE INVENTION

The present invention relates generally to spacecraft, and more particularly to a thruster orbit control method and configuration for a spacecraft.

BACKGROUND

Xenon-Ion propulsion systems have become widely used on Geosynchronous Orbit (GEO) communications spacecraft. These systems have much higher efficiency than chemical systems and can be an effective means to increase the payload mass delivered to orbit or enable launch on a less expensive and less capable launch vehicle. However, there are several significant issues affecting Xenon-Ion thruster use. First, their high energy plumes can erode spacecraft surfaces and distort communications signals. Also, they are expensive, heavy, and require high power to operate. Therefore, they are of greatest utility on large, high power communications spacecraft with high payload mass. Also, they are of the greatest benefit when used for partial orbit transfer, in addition to mission orbit stationkeeping. These issues constrain the ion-thruster mounting and gimbaling arrangements, which in turn affect how they must be operated and their overall efficiency.

Two standard ion-thruster configurations and orbit control methods are presently in use. One approach involves the use of four ion thrusters located on the aft end (anti-earth panel) of the spacecraft. Each thruster generates in-track, cross-track, and radial thrust components. The thrusters are placed on separate gimbaled platforms and positioned to allow both North/South (N/S) and East/West (E/W) stationkeeping. The drawback of this approach is reduced propellant efficiency and added operational complexity in the event of a single thruster failure. In fact, in this approach, if a thruster fails, three maneuvers must be executed to change the orbit inclination. Two maneuvers are used to change inclination, and a third maneuver corrects for the in-track perturbation effect of the first two. Because, propellant must be carried to ensure mission life for the failure case, spacecraft payload capability is reduced.

A second approach uses two articulated booms with two ion thrusters mounted on each boom. The booms are mounted on the north and south panels towards the aft end of the spacecraft. With this arrangement each thruster can only generate cross-track and radial thrust components. The advantage of this arrangement is that the booms can be oriented for orbit raising or N/S stationkeeping. Also, performance is unaffected by the failure of any one of the thrusters. The disadvantage of this arrangement is that it cannot support E/W stationkeeping. Therefore, additional thrusters or a separate propulsion system must be provided for this purpose, with added cost, complexity, and mass.

Accordingly, an improved ion-thruster orbit control method and configuration is desired that provides increased propellant efficiency, and does not require the use of a separate propulsion system for E/W stationkeeping. Also, an orbit control method is desired that results in only a nominal reduction in efficiency if a single thruster fails and that minimizes the required number of orbit control maneuvers.

SUMMARY OF THE INVENTION

Embodiments of the present invention provide an ion-thruster stationkeeping method and mounting configuration that reduces the propellant penalty when a single thruster fails, e.g., in the case where only three of a spacecraft's four ion thrusters are available.

In an embodiment, a thruster maneuver pair is used to control inclination in the event of a single thruster failure. The maneuver pair is offset from the orbit ascending and descending nodes. This offset allows inclination to be controlled without an associated eccentricity perturbation, for which the first standard approach requires a third maneuver to correct. By eliminating the need for the third maneuver, firing efficiency for the single-thruster failure case is improved.

In an embodiment, a thruster configuration supports both N/S and E/W stationkeeping using four ion thrusters (or three thrusters for the failure case). This configuration eliminates the need for a separate propulsion system or thrusters for E/W stationkeeping, unlike the second standard approach.

Figures 1A, 1B:
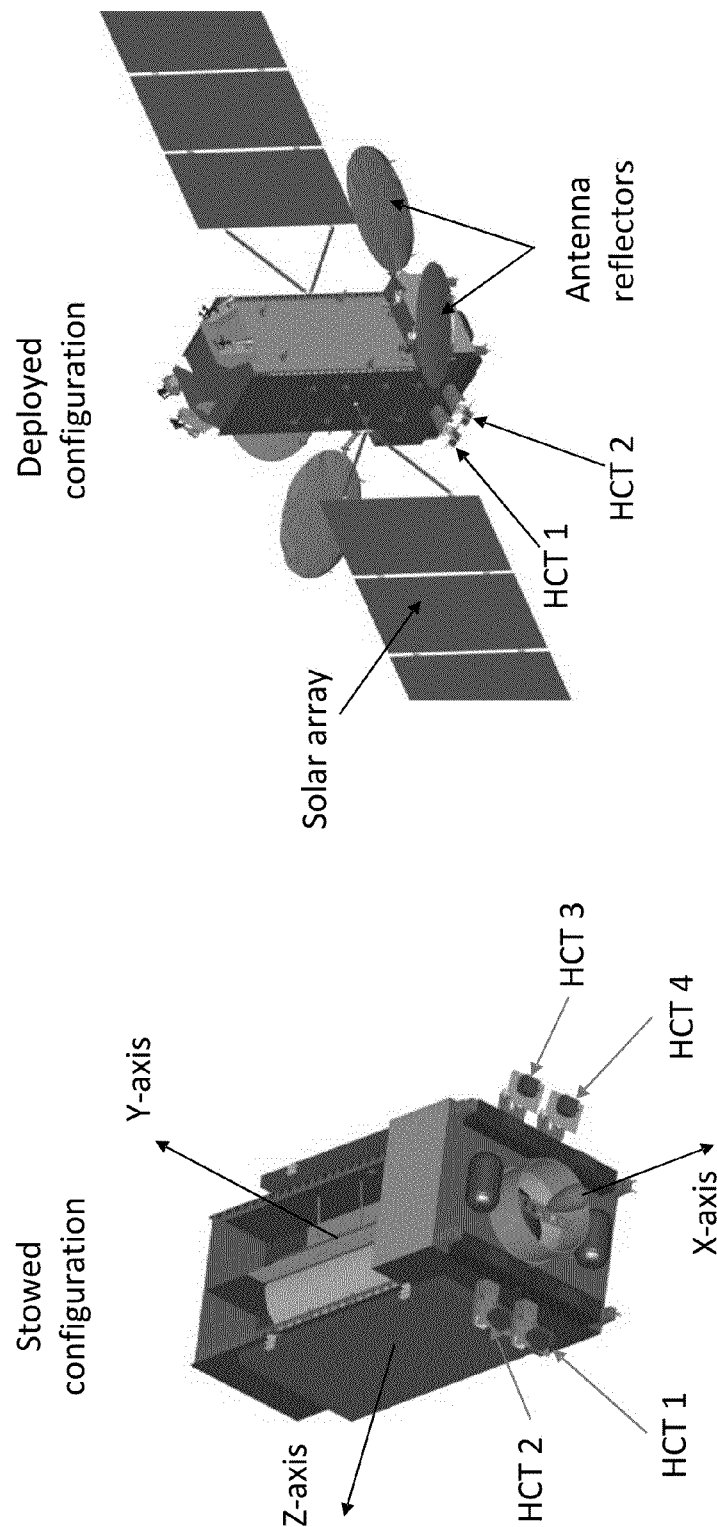
FIG. 1a shows a spacecraft with Hall Current Thrusters (HCTs) in a stowed configuration according to an aspect of the subject technology.
FIG. 1b shows the spacecraft with the HCTs in a deployed configuration according to an aspect of the subject technology.

The accompanying drawings, which are included to provide further understanding of the invention and are incorporated in and constitute a part of this specification, illustrate aspects of the invention and together with the description serve to explain the principles of the invention.

DETAILED DESCRIPTION OF THE INVENTION

In the following detailed description, numerous specific details are set forth to provide a full understanding of the subject technology. It will be obvious, however, to one ordinarily skilled in the art that the subject technology may be practiced without some of these specific details. In other instances, well-known structures and techniques have not been shown in detail to avoid obscuring concepts of the subject technology.

Reference will now be made in detail to aspects of the subject technology, examples of which are illustrated in the accompanying drawings, wherein like reference numerals refer to like elements throughout.

Embodiments of the present invention provide an ion-thruster stationkeeping method and mounting configuration that reduces the propellant penalty when a single thruster fails, e.g., in the case where only three of a spacecraft's four ion thrusters are available. By improving firing efficiency for the single-thruster failure case, on-board propellant is reduced, thereby allowing increased payload mass. Also, the configuration supports both N/S and E/W stationkeeping using four ion thrusters (or three thrusters for the failure case) and therefore does not require a separate propulsion system or thrusters for E/W stationkeeping. There are several different Xenon ion thruster technologies in wide use, including Hall Current Thrusters (HCTs) and gridded ion engines. In the present disclosure, various aspects of the present invention are described using the example of HCTs. However, it should be appreciated that the present invention is not limited to this example, and in fact is applicable to a wide variety of electric propulsion technologies.

FIGS. 1a and 1b show a GEO spacecraft and a HCT arrangement according to an embodiment of the present invention. The spacecraft body coordinate frame is defined by X (yaw), Y (roll), and Z (pitch) axes. The spacecraft includes four HCTs, each mounted on a two-axis gimbaled platform. The gimbals allow the orientation of the HCTs to be adjusted so they can be used for both stationkeeping and orbit raising. The HCTs are mounted adjacent to the aft end of the spacecraft (anti-earth face) to prevent HCT plume interference with communications signals and minimize plume impingement on solar arrays and antenna reflectors. FIG. 1a shows the spacecraft in a stowed configuration and FIG. 1b shows the spacecraft in a deployed configuration.

Figures 2A, 2B:
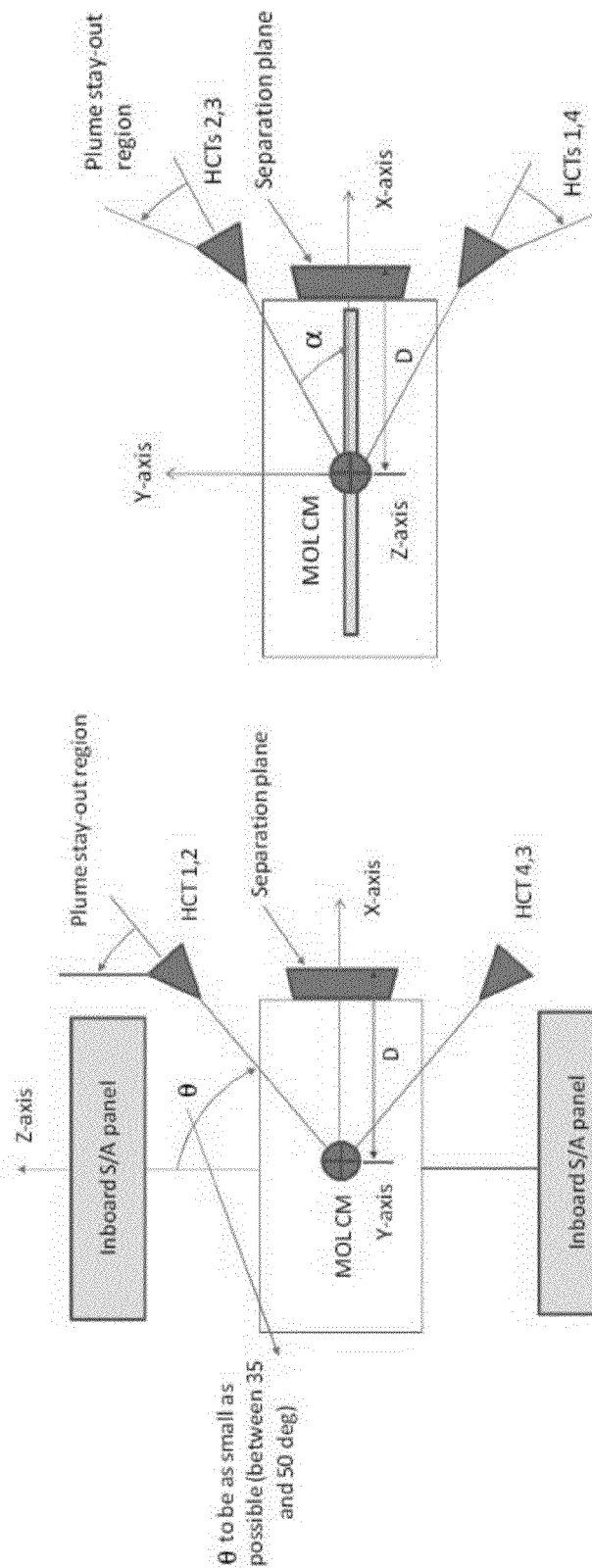
FIG. 2a shows a HCT thruster geometry in a X/Z plane according to an aspect of the subject technology.
FIG. 2b shows the HCT thruster geometry in a X/Y plane according to an aspect of the subject technology.

FIGS. 2a and 2b show a schematic of the HCT firing geometry. For stationkeeping maneuvers, a single HCT may be fired with its gimbaled platform angles adjusted to direct its thrust vector through the spacecraft center-of-mass (CM). In this orientation, the nominal HCT torque is zero and Reaction Wheel Assemblies (RWAs) may be used for attitude control. As is known in the art, the HCT orientation can be modulated about the nominal orientation to generate torque for RWA momentum adjust. The nominal HCT platform orientations depend on the HCT position coordinates in the body frame and the location of the spacecraft CM. This zero-torque orientation can be described by the angles shown in FIG. 2. Theta ($\theta$) is the angle of the HCT exit plane normal vector (minus thrust axis) from the spacecraft plus or minus Z-axis (pitch axis) and alpha ($\alpha$) is the angle between the X-axis (yaw axis) and the projection of the exit plane normal vector in the spacecraft X/Y (yaw/roll) plane.

Given these angle definitions, the HCT thrust unit vectors in the body frame are $$T = \begin{bmatrix} f_1 \\ f_2 \\ f_3 \\ f_4 \end{bmatrix} = \begin{bmatrix} -\sin\theta\cos\alpha & \sin\theta\sin\alpha & -\cos\theta \\ -\sin\theta\cos\alpha & -\sin\theta\sin\alpha & -\cos\theta \\ -\sin\theta\cos\alpha & -\sin\theta\sin\alpha & \cos\theta \\ -\sin\theta\cos\alpha & \sin\theta\sin\alpha & \cos\theta \end{bmatrix} \quad (1)$$

where the first column includes the thrust components in the X direction, the second column shows the thrust components in the Y direction, and the third column shows the thrust components in the Z direction.

It is convenient to consider the HCTs as comprising two pairs, HCTs 1 and 3 and HCTs 2 and 4. As can be seen in Eq. (1), all the HCTs have a thrust component in the minus X direction, as well as thrust components along the Y and Z axes. Note that the Y and Z thrust components for HCTs 1 and 3 have opposite signs. Similarly, the Y and Z thrust components for HCTs 2 and 4 have opposite signs.

Figure 3:
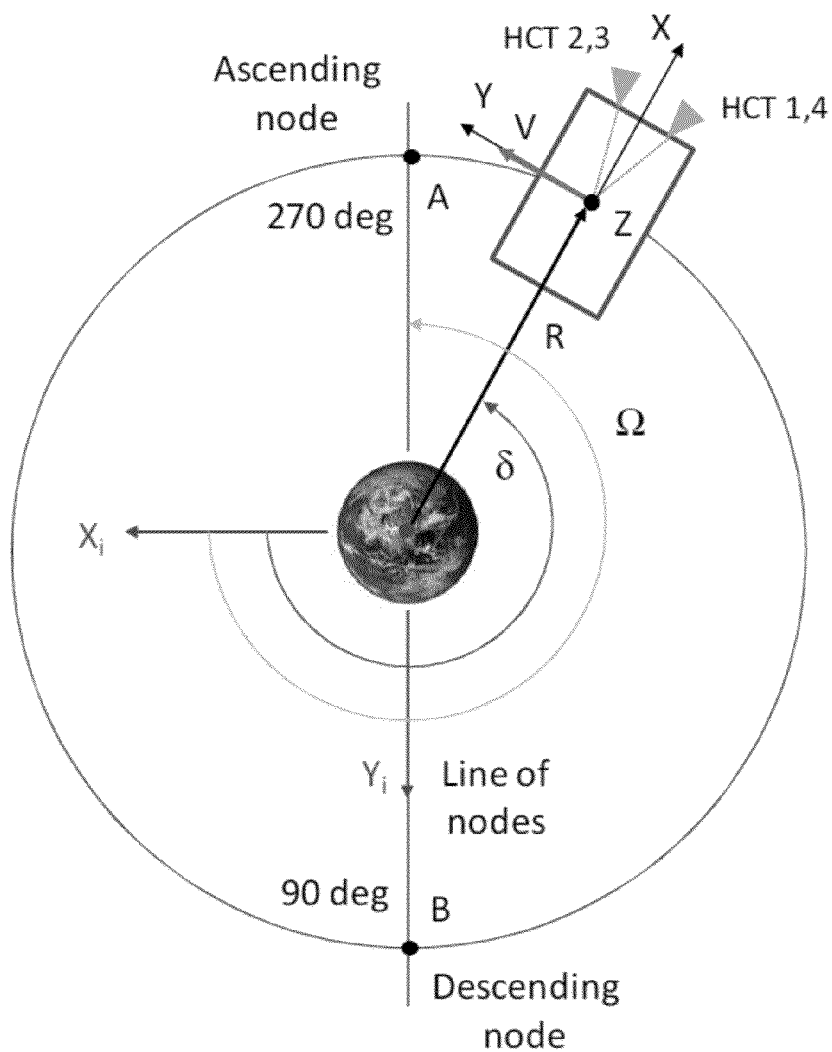
FIG. 3 shows a spacecraft orbit geometry according to an aspect of the subject technology.

FIG. 3 shows a GEO spacecraft in its mission orbit and attitude. An inertial reference frame is attached to the Earth denoted by the triad $X_i$, $Y_i$, $Z_i$. In this attitude, the spacecraft body Y-axis is parallel to the velocity vector (V), the Z axis is along the orbit normal, and the X-axis is along the Zenith vector (radius vector). FIG. 3 also shows the line of nodes, which lies in the Earth's equatorial plane and connects the ascending and descending nodes at orbit positions A and B, respectively. It is assumed that the orbit inclination is small, so the orbit and earth equatorial planes are nearly parallel (i.e., small angle between Z and $Z_i$ equal to the orbit inclination). The angle between $X_i$ and the ascending node is denoted as the orbit right ascension $\Omega$, which is 270 deg for this example. The angle from $X_i$ to the spacecraft radius vector, which describes the spacecraft position in orbit, is denoted as the spacecraft inertial longitude $\delta$. When the spacecraft inertial longitude is 90 deg the spacecraft is at the descending node, and when the longitude is 270 deg, the spacecraft is at the ascending node. When gimbaled to direct their thrust vectors through the spacecraft CM, each HCT produces radial (X), in-track (Y), and cross-track (Z) thrust. To maximize N/S stationkeeping efficiency it is necessary to minimize $\theta$, thereby making the cross-track thrust component (proportional to cos $\theta$) as large as possible. However, as shown in FIG. 2a, the minimum angle is generally constrained to be within 35 to 50 deg to keep the solar array outside of the HCT main plume region. Also, to maximize E/W stationkeeping efficiency, the in-track thrust component (proportional to sin $\theta$ sin $\alpha$) should be as large as possible. This suggests that the HCTs should be configured to maximize $\alpha$. However, as will be shown, for the single HCT failure case, this strategy would result in lower overall efficiency. In fact, as will be shown, there is an optimal $\alpha$ for which overall stationkeeping propellant efficiency for both E/W and N/S stationkeeping is maximized.

When all HCTs are available (no failures), a simple inclination control strategy is possible where HCTs 3 and 4 are fired at orbit position A, corresponding to an inertial longitude of 270 deg, and HCTs 1 and 2 are fired 12 hours later at orbit position B, corresponding to an inertial longitude of 90 deg. The firing produces a cross-track and radial Delta-V. The cross-track Delta-V results in an inclination change, and the radial Delta-V results in an eccentricity change $\Delta$e. When HCTs 3 and 4 are fired at 270 deg inertial longitude, the $\Delta$e vector will be along the $X_i$ axis (in the direction of the velocity vector). Assuming equal firing time of HCTs 1 and 2 at 90 deg inertial longitude, an equivalent Δe will be generated, but along the minus $X_i$ axis. Therefore, the eccentricity effects of the two firings cancel, leaving only the desired change in inclination. Note that in this and the subsequent discussion, the ascending node is located at 270 deg and the descending node at 90 deg inertial longitude. However, even if the nodes were reversed, with the ascending node at 90 deg and the descending node at 270 deg, the maneuver strategy would still be carried out at the indicated inertial longitudes using the same thrusters in the sequence described.

Also note, that in general the orbit control maneuvers will be optimized for maximum fuel efficiency and therefore may not be executed so their centroids occur precisely at 270 or 90 deg inertial longitudes. In fact, as is known to those with skill in the art, the "propellant-optimal" maneuver orbital locations may vary somewhat from these ideal locations so as to produce a change to the orbit right ascension in addition to an inclination change. Also, rather than firing two thrusters simultaneously, it is possible to carry out this general strategy firing one thruster at a time. For example, rather than firing HCTs 3 and 4 together, HCT 3 may be fired first, followed by the firing of HCT 4. With this approach, the indicated thrusters are fired in sequence to produce substantially the same effect as simultaneous firing over an orbit period. This is often the preferred mode of operation when the spacecraft power system cannot support firing of two thrusters simultaneously.

Figure 4:
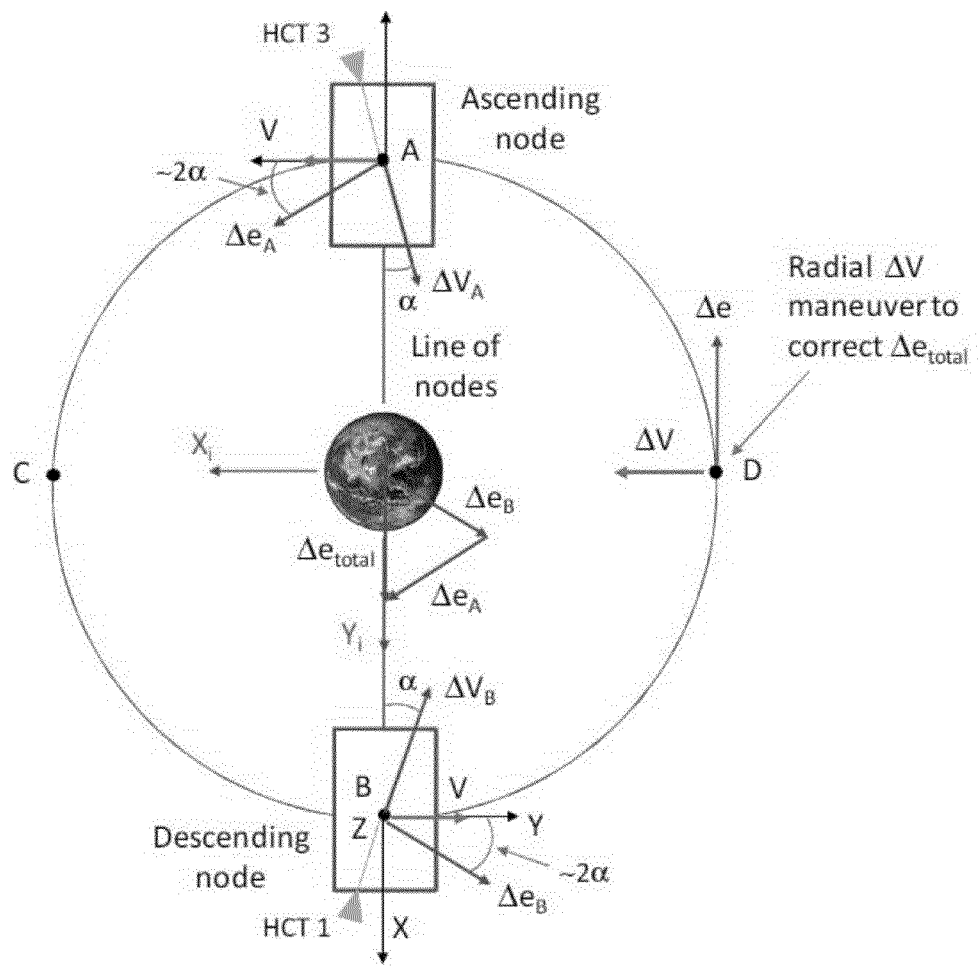
FIG. 4 illustrates a standard stationkeeping strategy with a single HCT failure.

Referring to FIG. 4, in the event of an HCT failure, the orbit control method may be modified as follows. According to a standard strategy, a single HCT is fired at an inertial longitude of 270 and 90 deg, which in this case corresponds to the location of the ascending and descending nodes at orbital positions A and B. For example, if HCT 2 or 4 has failed, HCT 3 is fired at position A, and HCT 1 is fired 12 hours later at position B. If HCT 1 or 3 fails, a similar strategy is carried out with HCT 4 fired at position A and HCT 2 fired at position B. Because each thruster produces in-track, cross-track, and radial thrust, each firing produces an eccentricity and drift (orbit period) change in addition to the desired inclination change. Because the in-track thrust components of HCTs 1 and 3 have opposite signs, the net drift effect is zero. However, the eccentricity effects of the two maneuvers ($\Delta e_A$ and $\Delta e_B$) do not cancel, and there is a net eccentricity vector error ($\Delta e_{total}$) along the line of nodes. This eccentricity error will compound for subsequent maneuvers, and hence must be corrected for the spacecraft to remain properly positioned in orbit. To accomplish this correction, a third maneuver may be performed at either orbital locations C or D, depending on which HCT pair is being used (HCTs 1 and 3, or 2 and 4). For the above example, HCTs 1 and 3 would be fired at position D to generate a pure radial Delta-V, thereby producing a change in eccentricity that cancels $\Delta e_{total}$.

There are several significant drawbacks to the standard strategy. First, for θ=45 deg and α=12 deg, each corrective radial maneuver may consume roughly 29% of the propellant required for the inclination-control maneuver pair, resulting in an excessive 22% N/S stationkeeping efficiency reduction. The additional propellant must be carried by the spacecraft, thereby reducing the spacecraft payload capability. Also, the correction maneuvers may result in an increased number of battery discharge cycles, which may necessitate larger and more expensive batteries, or a larger and more expensive solar array. Finally, there may be operational support costs associated with the additional maneuver.

Figure 5:
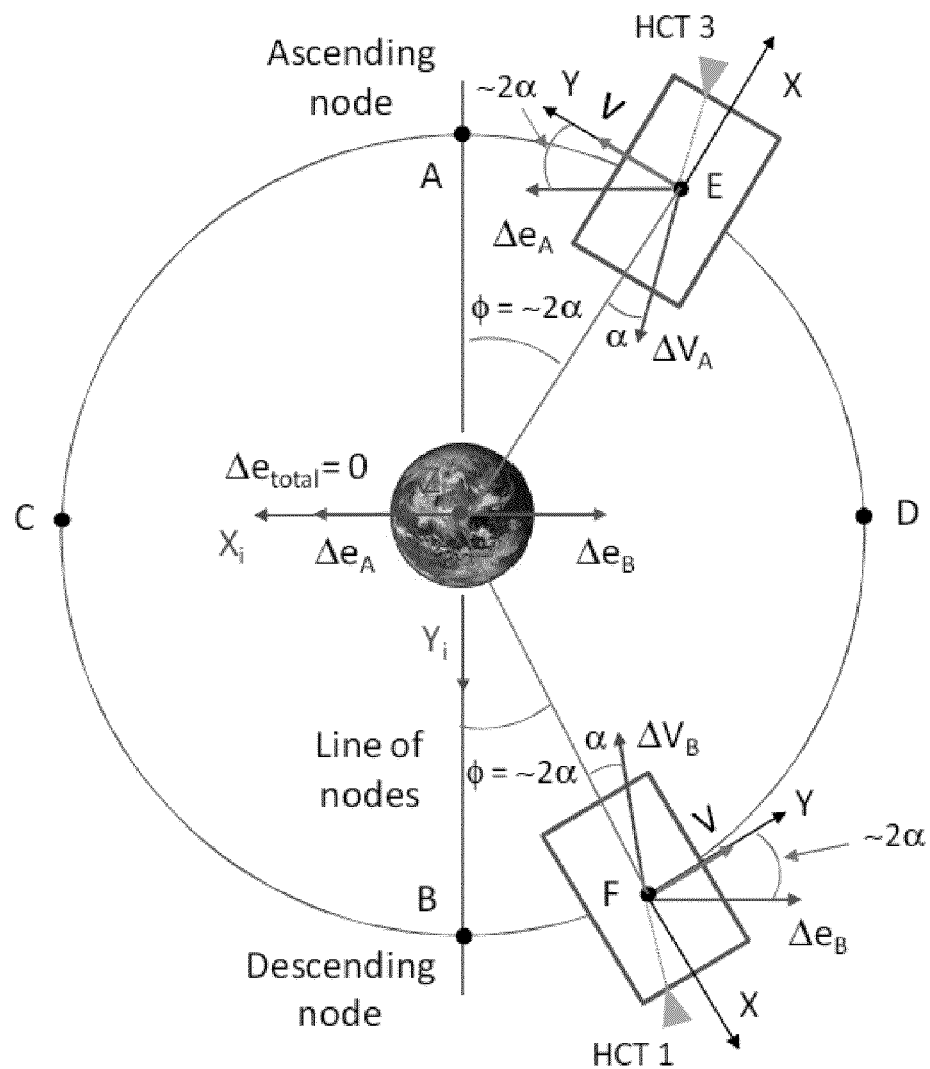
FIG. 5 illustrates the eccentricity effect of an improved staionkeeping strategy with a single HCT failure according to an aspect of the subject technology.

Various embodiments of the present invention address the above drawbacks of the standard strategy with a stationkeeping strategy that significantly improves propellant efficiency by eliminating the need for a third maneuver. As shown in FIG. 5, rather than perform the N/S stationkeeping maneuvers at the orbital positions A and B, the maneuvers are performed at locations E and F. For the above example (HCT 2 or 4 failed), the HCT 3 firing leads position A by an angle $$\phi = \tan^{-1}(2 \tan \alpha) \tag{2}$$

Figure 6:
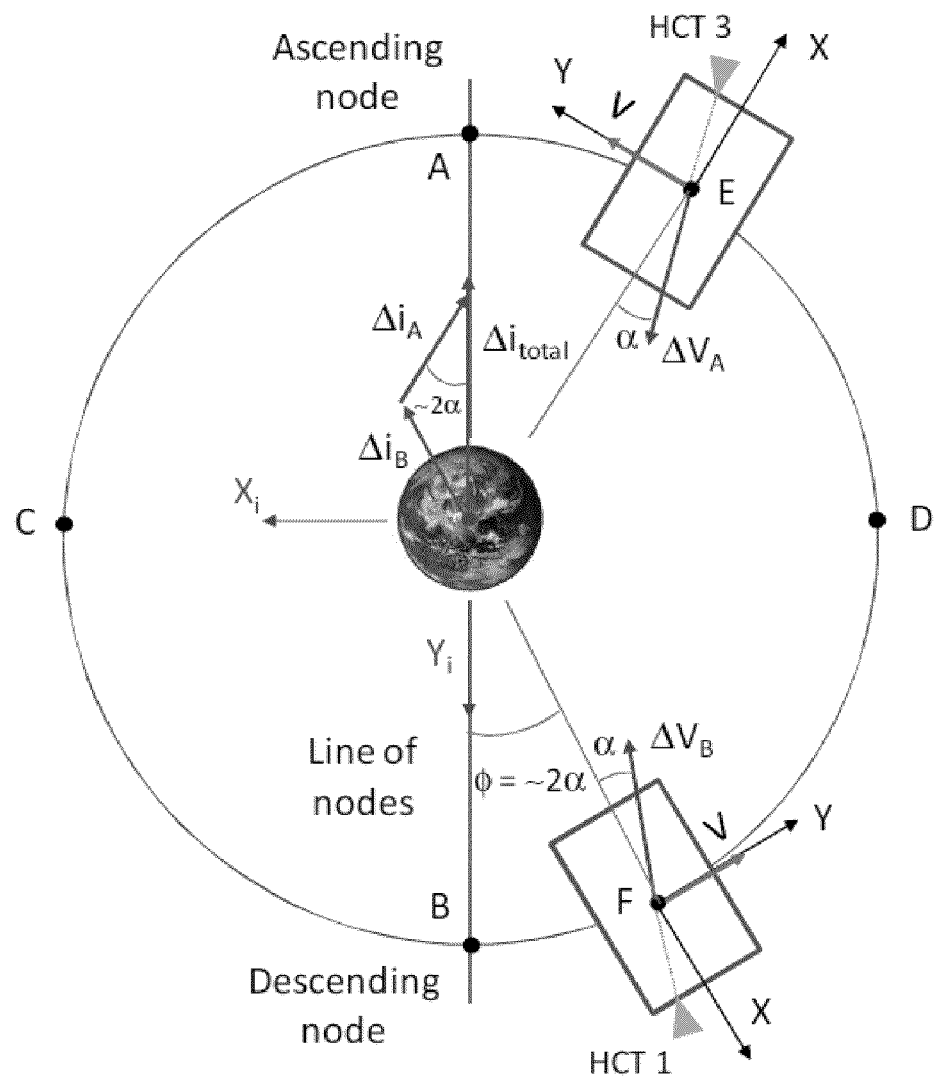
FIG. 6 illustrates the inclination effect of the improved staionkeeping strategy with the single HCT failure according to an aspect of the subject technology.

Note that for small α, $\phi \approx \alpha$. This first firing results in an eccentricity vector change $\Delta e_A$ along the $X_i$ axis. Following this, HCT 1 is fired at location F, which lags position B by φ, and results in an eccentricity change $\Delta e_B$ of the same magnitude but with opposite sign. The two maneuvers result in no change to the orbit eccentricity. Also, because the firings produce equal but opposite drift changes, there is also no change in the orbit period. Note that the offset given by Equation (2) may be with respect to the "propellant-optimal" maneuver locations for the non-failure case. As stated previously, these locations may be close to 270 and 90 deg inertial longitudes, which may or may not correspond to the orbit ascending or descending nodes. Furthermore, FIG. 6 shows the effect on the orbit inclination vector. The HCT 3 firing at position E produces a change in the inclination vector $\Delta i_A$ along the Zenith vector (radius vector). The HCT 1 firing at position F produces a change $\Delta i_B$ of equal magnitude, but along the Nadir vector (minus radius vector). The net result $\Delta i_{total}$ is an inclination change along the line of nodes towards 270 deg inertial longitude, which is the desired effect of the maneuver pair. As can be seen from the figure, the efficiency loss is $$\text{eff} = 1 - \cos \phi \approx 1 - \cos 2\alpha \tag{3}$$

which is 8% for α=12 deg, considerably less than the 22% loss using the standard approach.

Various embodiments of the present invention also provide a HCT mounting arrangement that provides improved propellant efficiency. As discussed above, each thruster generates in-track thrust, thereby allowing E/W stationkeeping. For the case where HCT 2 or 4 has failed, E/W stationkeeping maneuvers may use either HCT 1 or 3, or both thrusters depending on the magnitude and direction of the required eccentricity and drift corrections. A standard eccentricity control strategy may be implemented known as a sun-synchronous strategy where the eccentric vector remains oriented along the Sun line. To determine the optimal geometry, the overall stationkeeping propellant efficiency, which reflects both the efficiency of N/S and E/W stationkeeping, may be evaluated using the following expression $$ISP_{\text{eff}} = \frac{1}{\frac{F_{E/W}}{ISP_{E/W} \sin\theta \sin\alpha} + \frac{F_{N/S}}{ISP_{N/S} \cos\theta \cos\phi}} \tag{4}$$

where $F_{E/W}$ is the E/W stationkeeping fraction of the total stationkeeping Delta-V, and $ISP_{E/W}$ is the HCT ISP for E/W stationkeeping. Also, $F_{N/S} = 1 - F_{E/W}$ is the N/S fraction of the total Delta-V, and $ISP_{N/S}$ is the HCT ISP for N/S stationkeeping. Typical values for the stationkeeping Delta-V fractions are $F_{N/S} = 0.96$ and $F_{E/W} = 0.04$. In this expression, the N/S stationkeeping efficiency reflects the effect of offsetting the maneuvers from the ideal inertial longitudes of 270 and 90 deg (or ascending and descending nodes) as discussed above. Also, note that the HCT ISP depends on the HCT operating power and voltage and will in general be different for N/S and E/W stationkeeping. However, in the case where the HCT ISP is the same for N/S and E/W stationkeeping, i.e., $ISP_{N/S} = ISP_{E/W} = ISP_{HCT}$, the normalized effective ISP is $$ISP_{norm} = \frac{ISP_{eff}}{ISP_{HCT}} = \frac{1}{\frac{F_{E/W}}{\sin\theta\sin\alpha} + \frac{F_{N/S}}{\cos\theta\cos\phi}} \quad (5)$$

Figure 7:
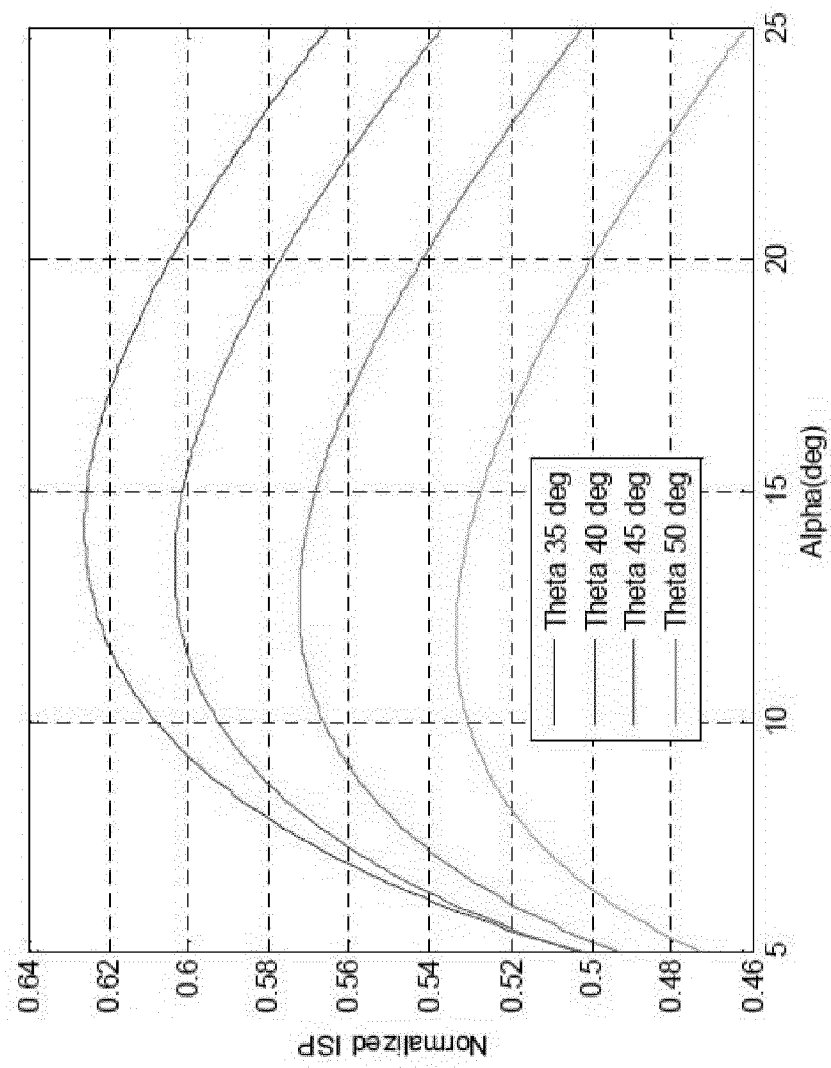
FIG. 7 is a plot showing stationkeeping propellant efficiency versus alpha according to an aspect of the subject technology.
Figure 8:
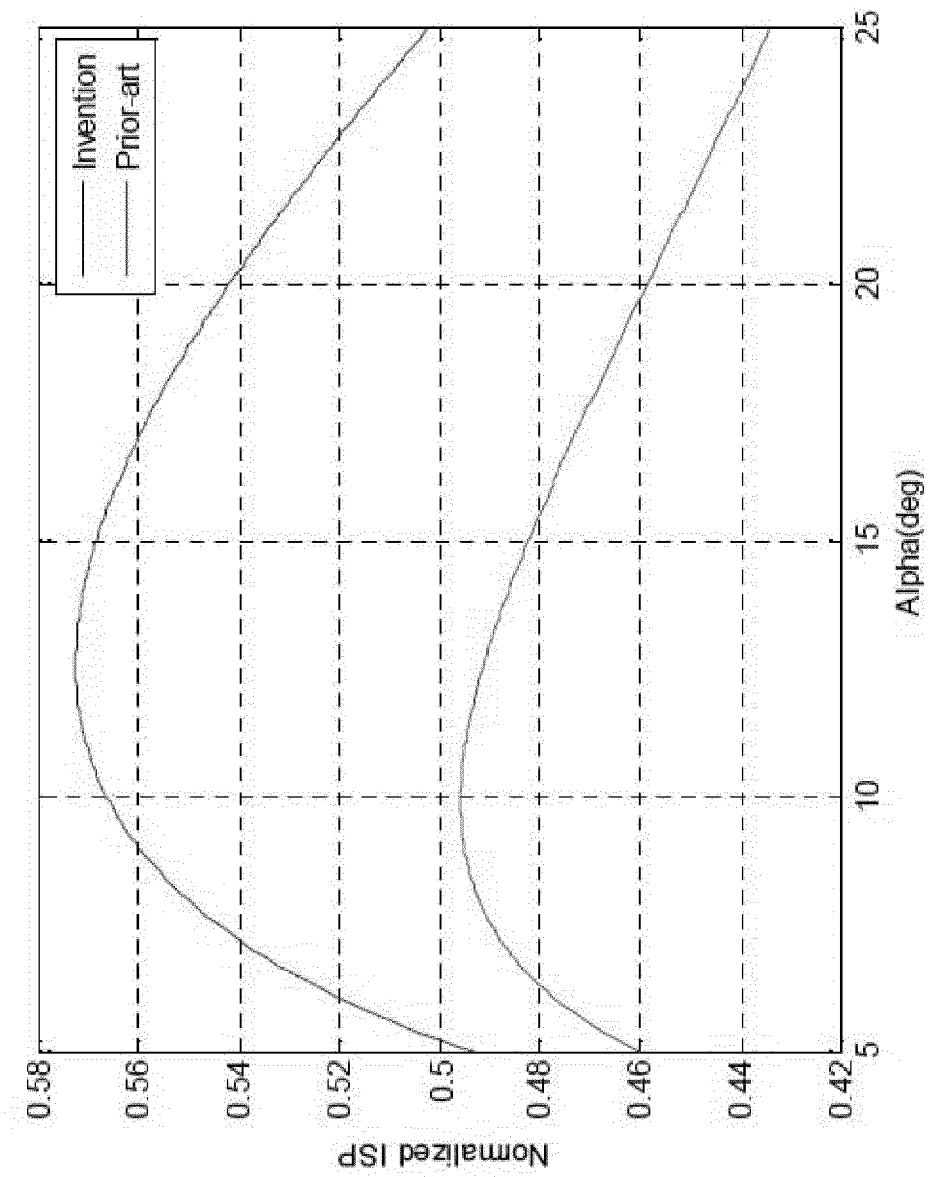
FIG. 8 is a plot comparing the stationkeeping propellant efficiency according to an embodiment of the present invention with a standard strategy.

FIG. 7 shows the normalized ISP plotted as a function of α for θ values of 35, 40, 45, and 50 deg. As can be seen, the value of α that maximizes the ISP is between about 11 to 15 degrees depending on θ. As discussed previously, θ is selected to be the smallest such that the HCT plume stay-out region constraints are achieved. According to the method of the invention, once θ is established, the separation of the HCTs along the spacecraft body Y-axis (see FIG. 1) is then determined to achieve the optimal α. FIG. 8 compares the normalized ISP for a system according to an embodiment of the present invention for θ=45 deg, and a system that performs N/S stationkeeping using the standard three-maneuver strategy disclosed above. For the system according to the present invention, the peak ISP is 15% higher (0.57 versus 0.49).

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A stationkeeping method for a spacecraft having an X-axis, a Y-axis, and a Z-axis, the method comprising:
    if there is no thruster failure on the spacecraft, then performing stationkeeping by firing one or more thrusters of the spacecraft at a first orbit position and firing another one or more thrusters of the spacecraft at a second orbit position;
    if a single-thruster failure occurs on the spacecraft, then performing stationkeeping by:
        firing a first thruster of the spacecraft at a third orbit position, wherein the third orbit position is offset from the first orbit position by an angle ϕ given by θ=tan⁻¹(2 tan α)

where α is an angle between the X-axis of the spacecraft and a projection of a thrust vector of the first thruster in an X/Y plane of the spacecraft; and
        firing a second thruster of the spacecraft at a fourth orbit position, wherein the fourth orbit position is offset from the second orbit position by the angle ϕ.

2. The method of claim 1, wherein an eccentricity change of the spacecraft resulting from the firing of the first thruster is substantially canceled out by an eccentricity change of the spacecraft resulting from the firing of the second thruster.

3. The method of claim 2, wherein the firing of the first thruster and the firing of the second thruster result in a net inclination change of the spacecraft.

4. The method of claim 1, wherein Y and Z thrust components for the first thruster have opposite signs to Y and Z thrust components of the second thruster.

5. The method of claim 1, wherein the first and second thrusters comprise ion thrusters.

6. The method of claim 5, wherein the first and second thrusters comprise Hall Current Thrusters (HCTs).

7. The method of claim 1, wherein the angle α is within a range of 10 to 15 degrees.

8. The method of claim 1, wherein the first and second thrusters are fired for approximately equal time durations.

9. The method of claim 1, wherein each of the first and second thrusters has a thrust vector passing through a center of mass of the spacecraft.

10. The method of claim 1, wherein the first orbit position is approximately at a 270 degree inertial longitude position and the second orbit position is approximately at a 90 degree inertial longitude position.

11. The method of claim 1, wherein the first orbit position is approximately at an orbit ascending node and the second orbit position is approximately at an orbit descending node.

* * * * *